(12) United States Patent
Carroll

(10) Patent No.: US 7,852,745 B2
(45) Date of Patent: Dec. 14, 2010

(54) NON-ORTHOGONAL FREQUENCY-DIVISION MULTIPLEXED COMMUNICATION THROUGH A NON-LINEAR TRANSMISSION MEDIUM

(75) Inventor: Sean C. Carroll, Kelowna (CA)

(73) Assignee: Signalink Technologies Inc., Kelowna, British Columbia (CA)

( * ) Notice: Subject to any disclaimer, the term of this patent is extended or adjusted under 35 U.S.C. 154(b) by 161 days.

(21) Appl. No.: 12/073,223

(22) Filed: Mar. 3, 2008

(65) Prior Publication Data

US 2008/0253400 A1    Oct. 16, 2008

Related U.S. Application Data

(60) Provisional application No. 60/904,382, filed on Mar. 2, 2007.

(51) Int. Cl.
*H04J 11/00* (2006.01)
*H04J 1/00* (2006.01)

(52) U.S. Cl. .................. 370/206; 370/208; 370/480

(58) Field of Classification Search ................ None
See application file for complete search history.

(56) References Cited

U.S. PATENT DOCUMENTS

| | | | |
|---|---|---|---|
| 4,554,668 A | 11/1985 | Deman et al. | |
| 4,850,036 A | 7/1989 | Smith | |
| 5,121,408 A | 6/1992 | Cai et al. | |
| 5,301,188 A | 4/1994 | Kotzin et al. | |
| 5,323,447 A | 6/1994 | Gillis et al. | |
| 5,408,496 A | 4/1995 | Ritz et al. | |
| 5,425,049 A | 6/1995 | Dent | |
| 5,425,051 A | 6/1995 | Mahany | |
| 5,442,660 A | 8/1995 | Kuo et al. | |
| 5,541,954 A | 7/1996 | Emi | |
| 5,701,584 A | 12/1997 | Dupuy | |
| 5,859,841 A | 1/1999 | Gitlits | |
| 5,946,624 A | 8/1999 | Petranovich et al. | |
| 6,009,332 A | 12/1999 | Haartsen | |
| 6,023,459 A | 2/2000 | Clark et al. | |
| 6,061,568 A * | 5/2000 | Dent ......................... | 455/450 |
| 6,112,094 A | 8/2000 | Dent | |
| 6,246,713 B1 | 6/2001 | Mattisson | |
| 6,272,353 B1 | 8/2001 | Dicker et al. | |
| 6,275,518 B1 | 8/2001 | Takahashi et al. | |
| 6,369,758 B1 | 4/2002 | Zhang | |
| 6,549,784 B1 | 4/2003 | Kostic et al. | |

(Continued)

FOREIGN PATENT DOCUMENTS

GB          2253765 A   *   9/1992

*Primary Examiner*—Chi H Pham
*Assistant Examiner*—Soon-Dong D Hyun
(74) *Attorney, Agent, or Firm*—Antony C. Edwards

(57) ABSTRACT

A method for non-orthogonal frequency division multiplexed communication through a non-linear transmission medium includes the steps of selecting at least one desired bandwidth, selecting a non-orthogonal pair of base frequencies within a first bandwidth of the at least one desired bandwidth, identifying where primary intermodulation products formed as a result of signal transmission on the pair of base frequencies fall within the first bandwidth. The method may also include the step of selecting a plurality of non-orthogonal interleaved frequencies adjacent at least one of the pair of base frequencies so as to be interleaved between the primary intermodulation products to form a frequency cluster which includes the at least one of the pair of base frequencies and the interleaved frequencies.

19 Claims, 6 Drawing Sheets

U.S. PATENT DOCUMENTS

| | | |
|---|---|---|
| 6,603,826 B1 | 8/2003 | Cupo et al. |
| 6,657,985 B1 | 12/2003 | Park |
| 6,788,729 B1 | 9/2004 | Posti |
| 6,801,767 B1 * | 10/2004 | Schwartz et al. ......... 455/426.2 |
| 6,826,409 B2 | 11/2004 | Kostic et al. |
| 7,099,268 B2 | 8/2006 | Ichihara et al. |
| 7,139,283 B2 | 11/2006 | Quigley et al. |
| 7,158,576 B2 | 1/2007 | Chung |
| 7,299,166 B1 * | 11/2007 | Liu et al. ...................... 703/13 |
| 7,328,162 B2 * | 2/2008 | Liljeryd et al. .............. 704/503 |
| 7,346,134 B2 * | 3/2008 | Smith ........................ 375/346 |
| 2005/0169411 A1 * | 8/2005 | Kroeger ..................... 375/350 |
| 2005/0227637 A1 * | 10/2005 | Nendick .................. 455/115.1 |
| 2006/0133470 A1 * | 6/2006 | Raz et al. .................... 375/232 |
| 2007/0110177 A1 * | 5/2007 | Molander et al. ........... 375/260 |

* cited by examiner

NON-ORTHOGONAL FREQUENCY-DIVISION MULTIPLEXED COMMUNICATION THROUGH A NON-LINEAR TRANSMISSION MEDIUM

CROSS REFERENCE TO RELATED APPLICATION

This application claims priority from U.S. Provisional Patent Application No. 60/904,382 filed Mar. 2, 2007 entitled Core Communication Controller.

FIELD OF THE INVENTION

This invention relates to the field of non-OFDM communications, and in particular to non-OFDM communications using frequency clusters which fill in the spaces between and include at least one of the adjacent non-orthogonal base or anchor frequencies.

BACKGROUND OF THE INVENTION

Orthogonal frequency division multiplexing (OFDM) is a communications technique that divides a communication channel into a number of equally spaced frequency bands. A subcarrier carrying a portion of the user information is transmitted in each band. Each subcarrier is orthogonal with every other subcarrier, differentiating OFDM from frequency division multiplexing (FDM).

As a digital transmission technique, OFDM uses a large number of subcarriers spaced apart at slightly different orthogonal frequencies. Each subcarrier can transmit a lower-speed signal, all of which are aggregated at the receiving side into the original high-speed signal. Lower speed signals are more easily deciphered at the receiving end.

In some respects, OFDM is similar to conventional frequency-division multiplexing (FDM). The difference lies in the way in which the signals are modulated and demodulated. Priority is given to minimizing the multi-path interference among the channels and symbols comprising the date stream. Less importance is placed on perfecting individual channels.

A problem with OFDM is that non-linearity in the signal chain will cause intermodulation distortion that raises the noise floor, may cause inter-symbol interference, and generates out-of-band spurious radiation. The linearity requirement is demanding, especially for transmitter RF output circuitry where amplifiers are often designed to be non-linear in order to minimize power consumption.

Non-linearity is also a problem for FDM where in many practical communication systems, the power amplifier in the transmitter has nonlinear characteristics, and nonlinear amplification leads to the creation of out-of-band spectral components and harmonics that interfere with other FDM channels. Thus, it is necessary to use more complex linear amplifiers in FDM systems.

So far the discussion has been about non-linearity in the equipment used to transmit and receive a signal. The case where the transmission medium itself is non-linear is even more challenging. In this case even if the equipment is perfect the transmission medium itself will cause signal mixing and harmonic distortion to occur. This is a serious problem to be overcome if multiple channels are required or desired in such a system.

In the prior art of which applicants are aware, U.S. Pat. No. 6,760,300 to Eberle et al. discloses a wired or wireless communication system and methods based on OFDM modulation technique, which contemplates non-orthogonal frequency division multiplexing as a training signal for only the first part of the signal, and using OFDM for the second part of the signal. Eberle et al. does not contemplate the ability to send signals on a non-orthogonal frequency "cluster" which fills in the spaces between an adjacent pair of, or otherwise includes at least one of the non-orthogonal base or anchor frequencies, nor does Eberle teach the avoidance of intermodulation distortion as taught herein.

SUMMARY OF THE INVENTION

The method according to the present invention is a novel communication method which is purpose designed for transmission through a non-linear transmission medium and not adapted from other dedicated wire, radio or cellular transmission applications.

The method uses a series of communications frequencies in a non-orthogonal frequency-division multiplexing (non-OFDM) configuration with base or anchor frequencies at a predetermined spacing that allows digital filtration with a large amount of separation (for example ~80 dB), the frequencies being selected so that interference from intermodulation and harmonic distortion is minimized.

Devices designed and operating according to the present invention can send regular priority or lower bandwidth communication on a single frequency. If high priority and/or speed of delivery is needed the devices that require the extra functionality can send on a frequency cluster. High priority messages can be transmitted in parallel with redundant messages on each sub-channel in the cluster. Similarly, normal priority messages that require higher bandwidth can take place over the cluster with each sub-channel sending different data. The inter-symbol interference is reduced by not having the frequencies in a cluster be orthogonally related.

In summary, the present invention may be characterized in one aspect as including a method for non-orthogonal frequency division multiplexed communication through a non-linear transmission medium, where the method includes the steps of:

(a) selecting at least one desired bandwidth;
(b) selecting a non-orthogonal pair of base frequencies within a first bandwidth of said at least one desired bandwidth; and,
(c) identifying where primary intermodulation products formed as a result of signal transmission on said pair of base frequencies fall within said first bandwidth so as to enable the selection of additional frequencies which avoid the primary intermodulation products.

Advantageously, the method may also include the step of selecting a plurality of non-orthogonal interleaved frequencies adjacent at least one of said pair of base frequencies so as to be interleaved between said primary intermodulation products to form a frequency cluster which includes said at least one of said pair of base frequencies and said interleaved frequencies. The plurality of non-orthogonal interleaved frequencies may advantageously be non-harmonic.

The method may further include the step of adapting said at least one frequency cluster for sending a high priority communication on said at least one frequency cluster or for sending a high bandwidth communication on said at least one frequency cluster.

The method may further includes the step of adapting said at least one frequency cluster for sending a redundant communication on said at least one frequency cluster.

The method may further include the step of adapting said frequency cluster for sending a communication in bursts in parallel during periods of for example reduced noise interference.

The step of selecting a plurality of non-orthogonal interleaved frequencies may include selecting non-orthogonal interleaved frequencies that fill-in between said pair of base frequencies. Alternatively, the step of selecting a plurality of non-orthogonal interleaved frequencies may include selecting non-orthogonal interleaved frequencies that cluster adjacent a single base frequency or both of said pair of base frequencies, for example so as to sandwich a single base frequency between said adjacent interleaved frequencies.

The method may further include the step of selecting a third base frequency within said first bandwidth wherein said third base frequency is outside of said primary intermodulation products.

The method according to another aspect of the present invention may include the step of selecting a second desired bandwidth so as to at least partially but not entirely overlap said first bandwidth to thereby form corresponding first and second partially overlapping frequency groups. For example, said first frequency group may be, with the exception of said overlap, of higher frequency than said second frequency group. The second frequency group may also contain a frequency cluster, selected as per selection of a frequency cluster or frequency clusters in the first frequency group as described above and as better described herein.

BRIEF DESCRIPTION OF THE DRAWINGS

With reference to the drawings wherein similar characters of reference denote corresponding parts in each view.

DETAILED DESCRIPTION OF EMBODIMENTS OF THE INVENTION

Figure 1:
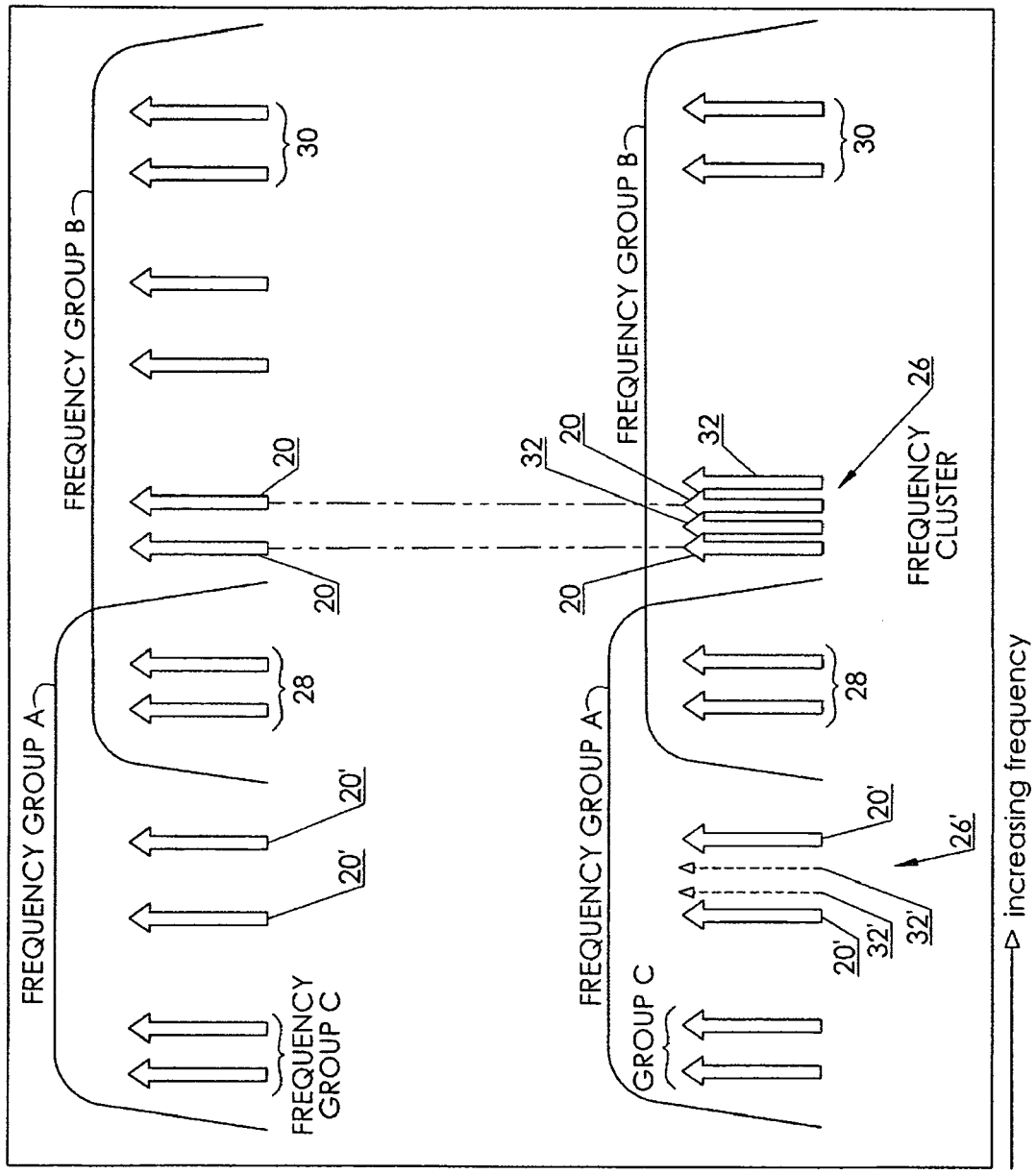
FIG. 1 is a diagrammatic illustration of the method of the present invention.

The top portion of FIG. 1 diagrammatically illustrates the method of the present invention for multiple frequencies. The frequencies are grouped into groups A, B and C, although this is not intended to be limiting. This represents the fact that a single device need not listen or transmit on all system frequencies. Note that there is overlap between the groups so that the system can be coordinated by a device that does listen to and transmit on frequencies from two or more groups. As well, this overlap allows devices to cooperate to route messages. If for example there are more devices of type A than type B, the type B devices can request routes through the type A devices using the overlapping frequencies.

The frequencies are spaced so that they will not interfere. They are spaced so that a digital filter can separate them to a large degree, on the order of 80 dB of separation. An example of a useful digital filter would be a Blackman-Harris window function modulated with a sine or cosine waveform at the frequency of interest. Note that this process does not require that an integer number of waveforms fit into the window function. Unlike orthogonal frequency-division multiplexing (OFDM) the frequencies are not harmonically spaced.

Figure 2:
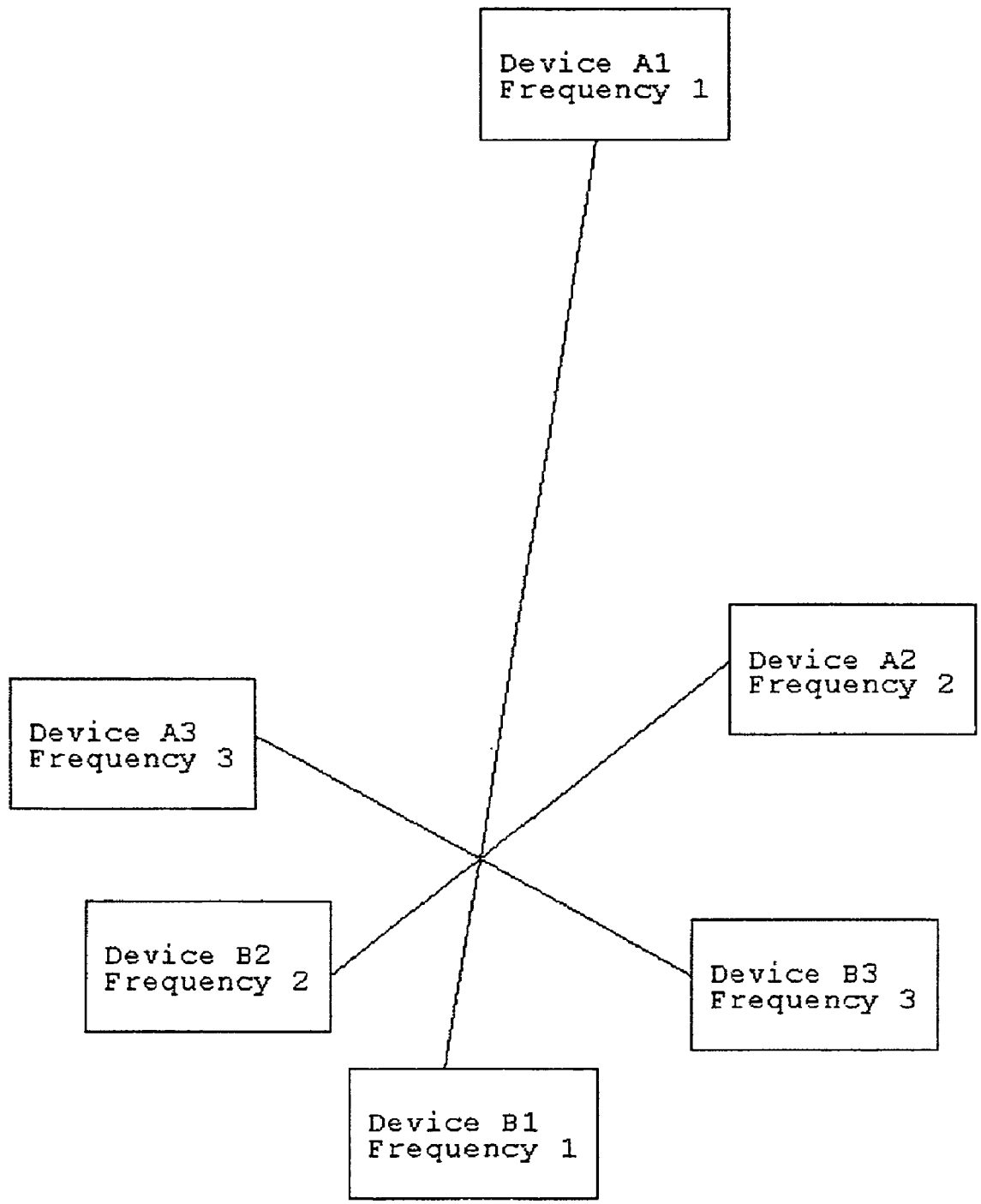
FIG. 2 is a diagrammatic illustration of three pairs of cross communicating devices showing attenuated communication between one of the pairs.

The importance of frequency spacing is illustrated in FIG. 2. In FIG. 2 device A2 is communicating with device B2 on frequency f2. Device A3 is communicating with device B3 on frequency f3. Device A1 is attempting communication with device B1 on frequency f1. It is assumed that the signal from A1 is attenuated. This is indicated graphically by showing the device A1 further away from the other devices. If the devices are communicating in a non-linear medium, the devices communicating on frequency f2 and f3 will cause intermodulation products to be generated, as well harmonics of f1 and f2 will be generated. If these intermodulation products or harmonics fall into the band of frequency f1 they can obscure the attenuated signal from device A1.

Intermodulation distortion is caused when non-linearity in the signal chain mixes signals to form spurious outputs. If two signals are being transmitted, one at frequency fa and another at frequency fib, this mixing causes intermodulation products to appear at $2*fa-fb$, $2*fb-fa$, $3*fa-2*fb$, $3*fb-2*fa$, etc. The third order intermodulation products generated by two frequencies are of most significant concern in the illustrated example. Thus as illustrated in the example, in the present invention, as would be understood to one skilled in the art, those intermodulation products which are of largest amplitude and thus of primary concern are herein collectively referred to as primary intermodulation products. In the illustrated example those largest intermodulation products occur at $2*fa-fb$ and $2*fb-fa$. As well harmonics appear at $2*fa$, $2*fb$, $3*fa$, $3*fb$, etc. The dominant harmonics at $2*fa$, $2*fb$ are intended herein to be included in the defined term primary intermodulation products. The intermodulation products and harmonics which are other than the primary intermodulation products are defined herein as secondary intermodulation products. The illustrated example is not intended to be limiting.

An example of a case where the above scenario is likely is in power line communications. The power line, especially inside of buildings, has non-linear impedance characteristics due to the devices that are connected to it. For example a power supply that connects to the power line through one or more diodes will in almost every case cause intermodulation distortion. As well there tends to be large amounts of attenuation on the power line inside of buildings. Another example of a non-linear transmission medium is optical fiber where Kerr non-linearity causes intermodulation products to be produced.

Figure 3:
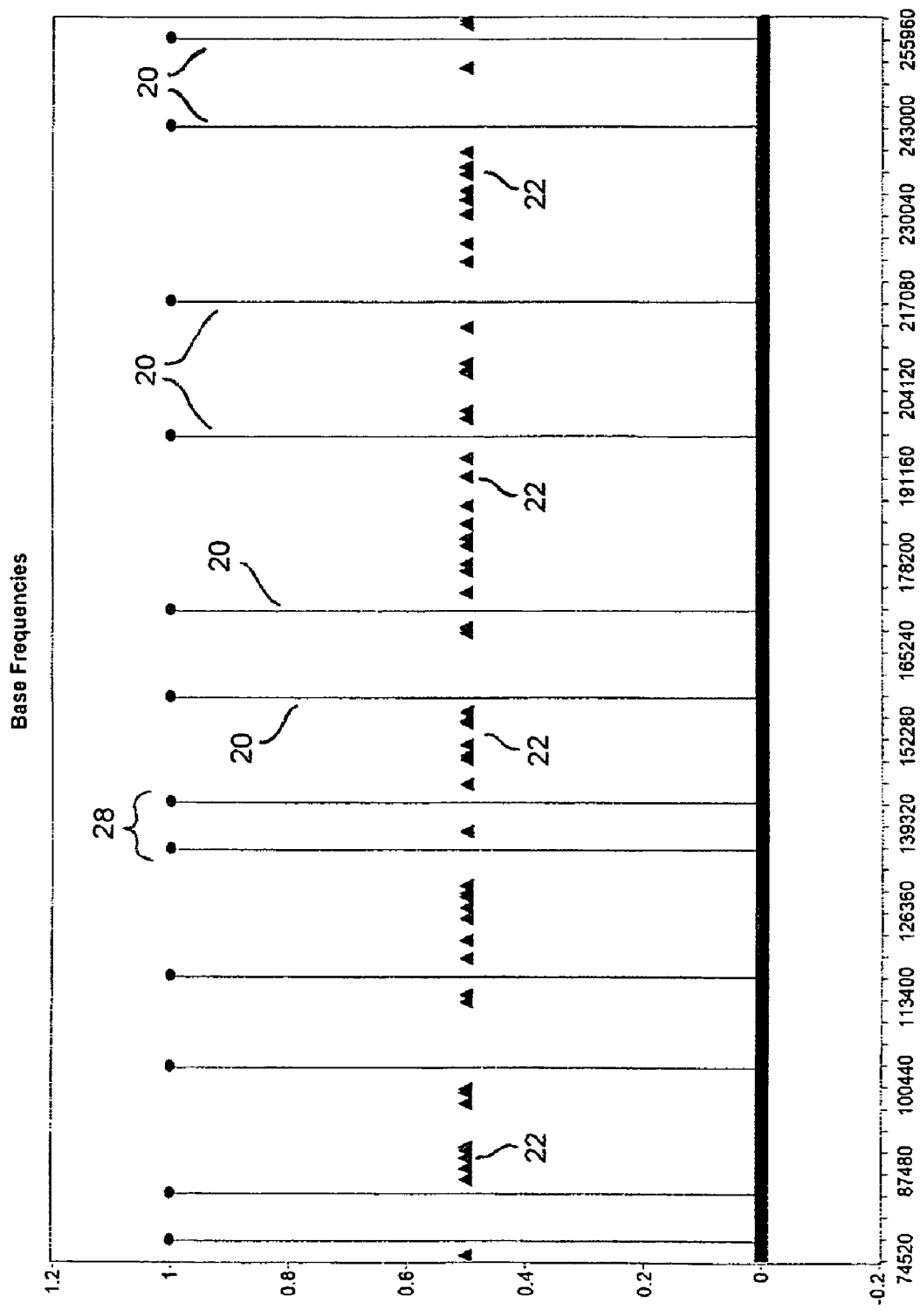
FIG. 3 is an illustration of the non-orthogonal frequency-division multiplexed communication through a non-linear transmission medium according to the example of the upper portion of FIG. 1.

FIG. 3 shows base or anchor frequencies 20 (indicated by stems with round dots) that are selected so that these types on intermodulation products do not fall within the bandwidth of another frequency. Hence they are referred to herein as base or anchor frequencies. Any two frequencies, fa and fb, will not form intermodulation products of $2*fa-fb$ or $2*fb-fa$ that fall within the bandwidth of any other frequency. As well they are chosen so that neither $2*fa$ nor $2*fb$ falls within the bandwidth of any other frequency. Thus in FIG. 3 the stems with the round dots at their upper ends indicate the frequencies that are used in normal communications. The triangleshaped symbols 22 indicate where in the frequency spectrum the primary intermodulation products are produced. The relative height of these symbols 20, 22 as plotted is not indicative of their amplitude, except that the primary intermodulation products are of lower amplitude than the base frequencies that generate them. As can be seen the base frequencies fall into gaps in the intermodulation products and as well avoid the harmonics.

The frequencies were chosen by selecting two frequencies, f1 and f2, within the desired band and noting where the primary intermodulation products, 2*f1-f2, 2*f2-f1, 2*f1 and 2*f2 occurred. A third frequency was then selected from the band that was outside of these primary intermodulation products and enough removed from f1 and f2 to allow filtering. Note that there are no further requirements, such as the frequencies being required to have an integer number of waveforms occur over a time period. This process was repeated now considering the next set of primary intermodulation products, that is, 2*f1-f2, 2*f1-f3, 2*f2-f1, 2*f2-f3, 2*f3-f1, 2*f3-f2, 2*f1, 2*f2, Q*f3 to select f4, and so on, until all frequencies had been selected.

The frequencies were also selected so that frequency clusters could be formed that meet the same criterion of non-interference.

In FIG. 1 it is assumed that devices in group B may need to transmit at a higher rate than is possible using a single frequency. As shown in the lower part of FIG. 1, these devices can send signals in a frequency cluster 26, filling in the spaces using interleaved frequencies 32 between, or spread to either side of, or a combination of both of these, so as to include at least one of the base frequencies 20. In the illustrated example then, the device listens to the frequency cluster 26, the shared frequencies 28 and the upper two frequencies 30. Note that this does not require higher computational power because the device is still listening to same number of frequencies. It is advantageous to have these clusters 26 be formed close to and contain at least one of the base frequencies 20 because the devices can utilize such a cluster that is formed around a frequency that has proven to be reliable, that is which is well adapted to serve as a base frequency 20.

Figure 4:
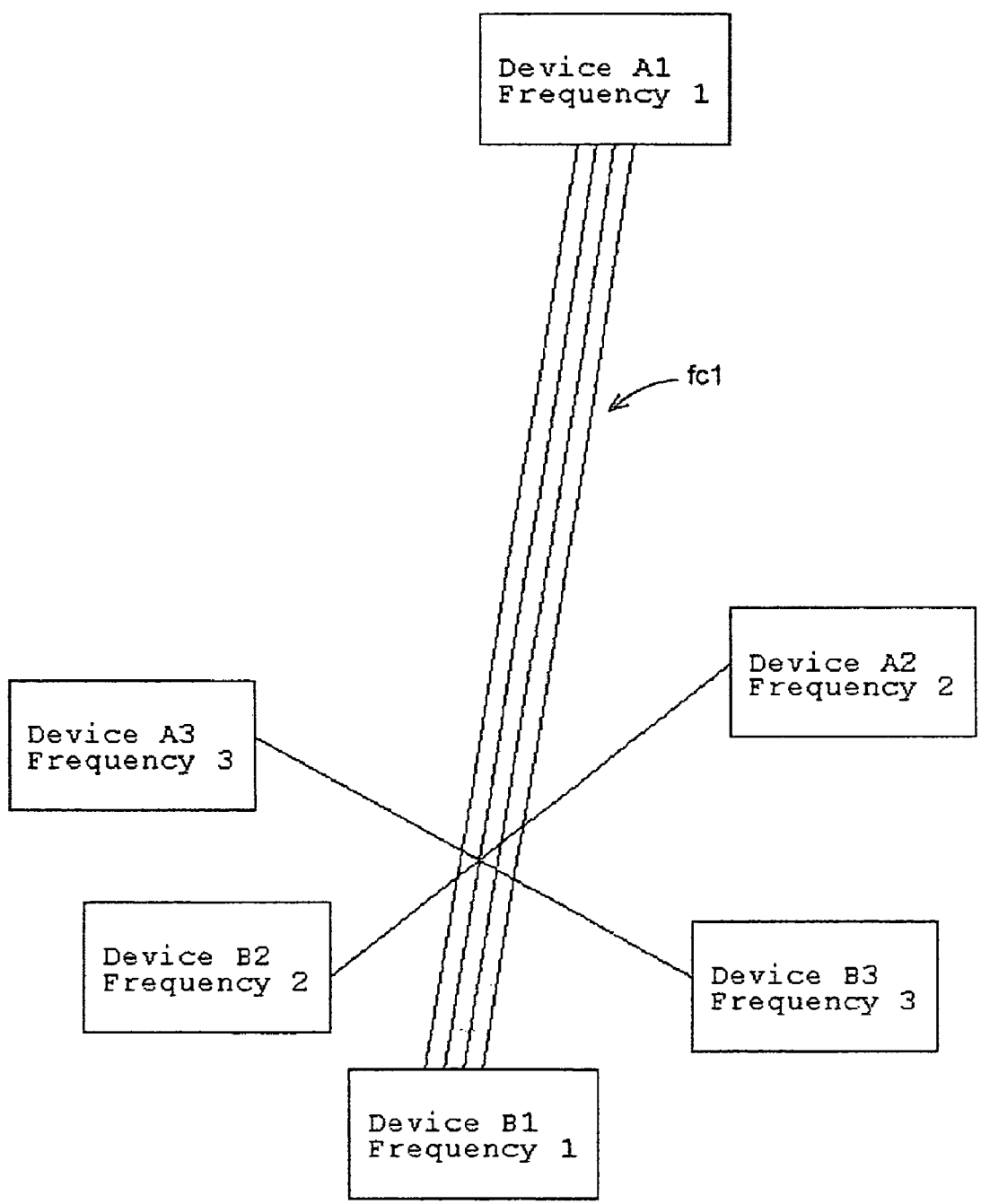
FIG. 4 is the example of FIG. 2 amended to diagrammatically illustrate the use according to one aspect of the present invention of a frequency cluster between the communicating pair having attenuated communication.

Again, the frequencies are chosen so that they meet the non-interference criterion. The frequencies in a cluster do not need to be as highly separated from the intermodulation products they produce themselves because the signal is from a single device. Any intermodulation products that are formed by the frequencies within a cluster and that fall within a cluster are caused by frequencies of relatively similar amplitude. FIG. 4 helps clarify this.

It may be that use of a frequency cluster 26' is called for in frequency group A, in which case interleaved frequencies 32' (shown in dotted lines in the lower portion of FIG. 1) may be interleaved adjacent base frequencies 20' as an illustration of a further example which is not intended to be limiting.

In FIG. 4, as in FIG. 2, device A2 is communicating with device B2 on frequency f2. Device A3 is communicating with device B3 on frequency f3. Now device A1 is attempting communication with device B1 on a frequency cluster, fc1, shown as four parallel lines. The frequencies within the cluster will cause intermodulation products that can land within the cluster. However, as they are transmitted from the same source the frequencies will be received at relatively similar amplitudes. This is different from the case shown in FIG. 2 where nearby transmissions can obscure more attenuated signals. However, in an environment like the power line differences in attenuation between the frequencies may reduce the amplitude of one or more of the frequencies in a cluster as compared to the others. After this attenuation has occurred the frequencies can mix causing intermodulation products to reduce the quality of, or obscure, the more attenuated frequencies. It is therefore advantageous to have the frequencies in a cluster not be harmonically related.

Figure 5:
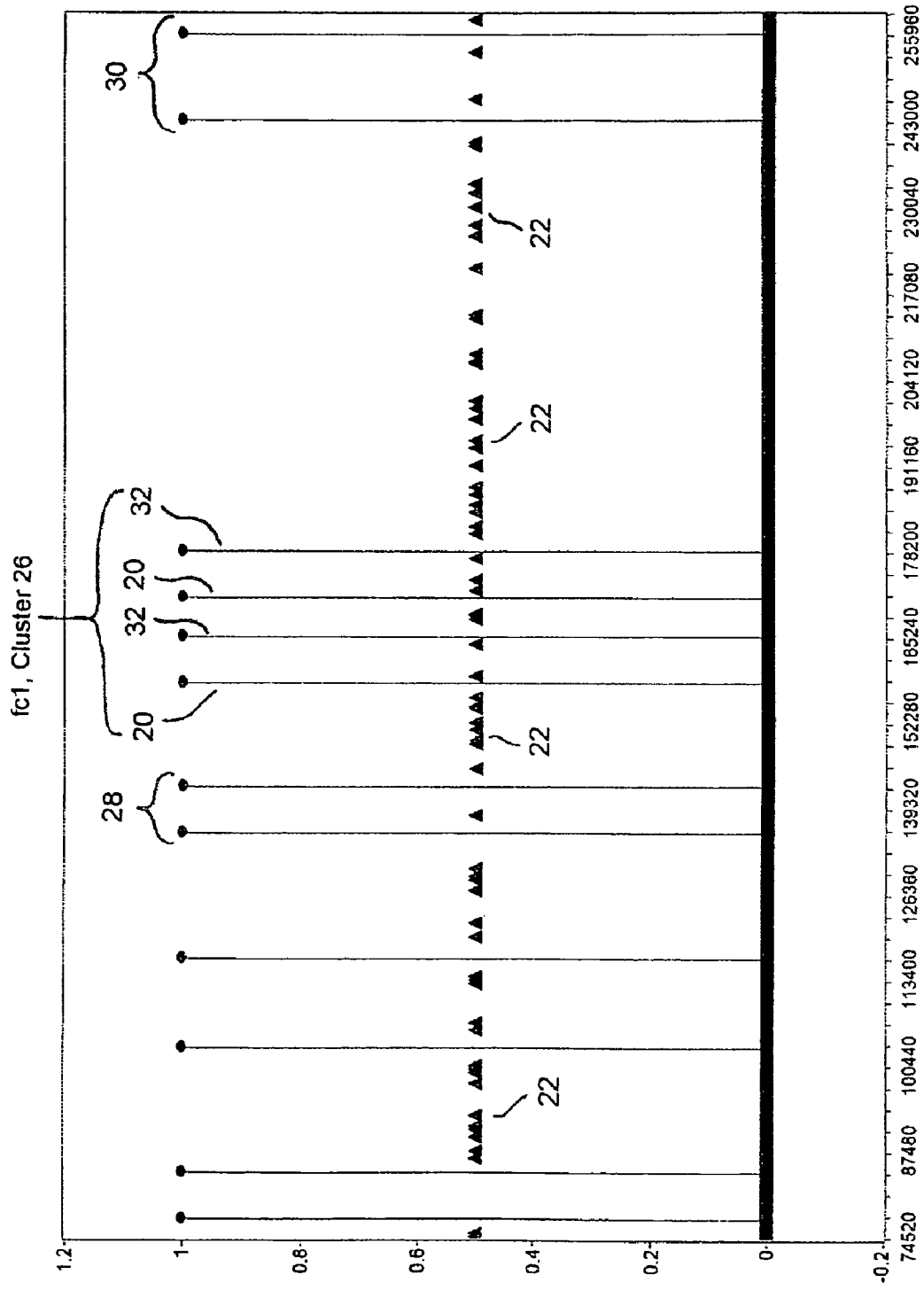
FIG. 5 is the illustrated example of FIG. 3 amended to illustrate the use of a frequency cluster according to the example of the lower portion of FIG. 1.

FIG. 5 shows a plot similar to FIG. 3 but with a frequency cluster 26. As in FIG. 3 the stems with the round dots indicate the frequencies 20 that are being used. The triangles 22 indicate where the primary intermodulation products are produced. The primary intermodulation products 22 that fall closest to the frequencies 20, 32 within the cluster 26 are caused by the frequencies 20, 32 within the cluster. As can be seen the separation between these frequencies 20, 32 and their primary intermodulation products 22 is smaller. It is however significant. Utilizing a Blackman-Harris window function to generate a filter, as described above, these primary intermodulation products 22 are reduced by over a factor of six by filtering. That is their effect is reduced to one sixth of what it would be if they had occurred at a frequency in a cluster.

Figure 6:
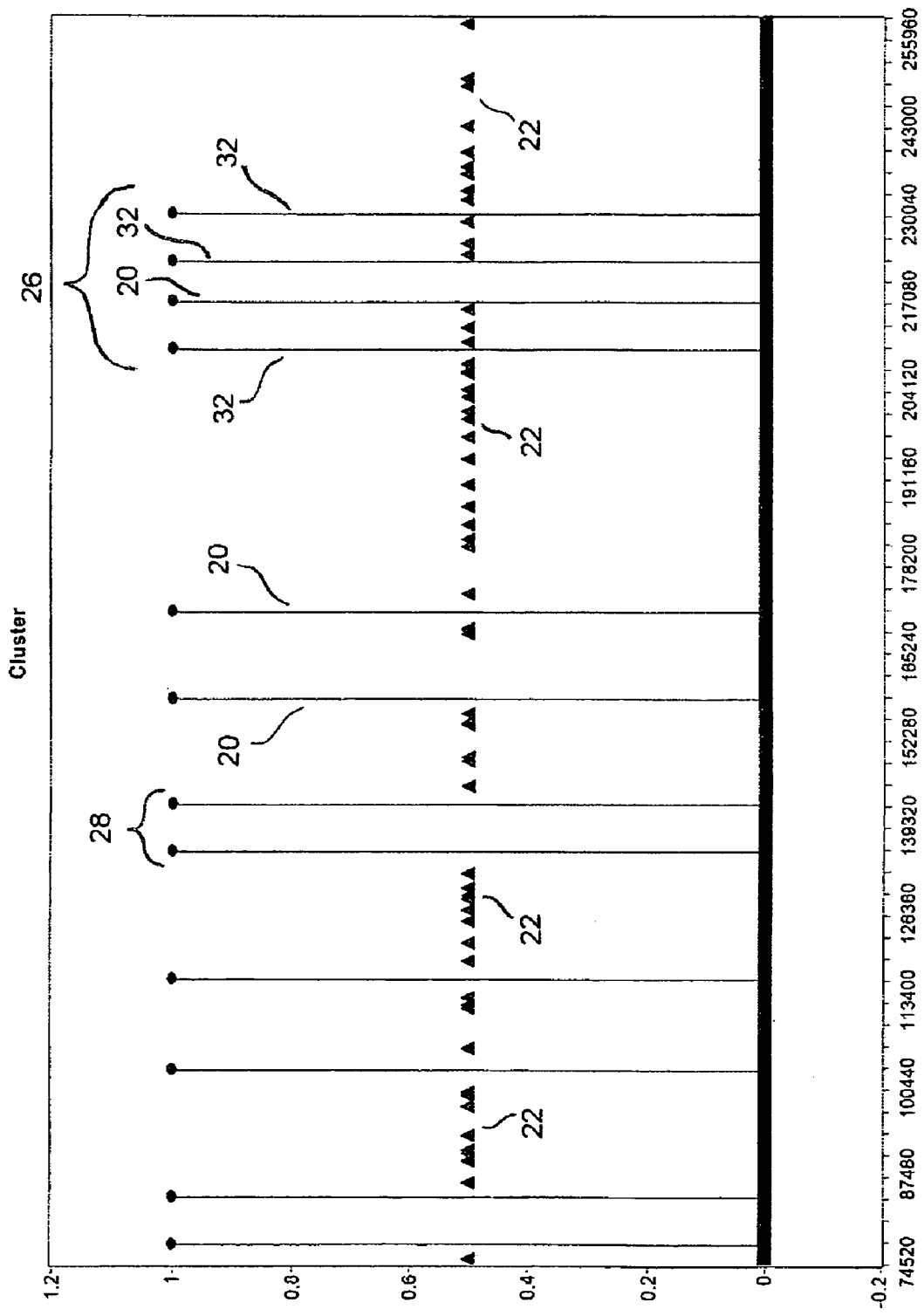
FIG. 6 is an example of the use of a second frequency cluster according to one aspect of the method of the present invention.

FIG. 6 shows a plot similar to FIG. 5 but where a different cluster 26 has been formed around a different base frequency 20.

Referring back to FIG. 1, with respect to the organization of the groups, frequency group A devices are envisioned as low data rate devices that are fairly inexpensive, group B devices are devices with higher data rate requirements and are therefore higher in cost than group A devices. Because group B devices are more expensive they are placed higher in the frequency band as more filtering and/or a more expensive output stage will be necessary to meet emission regulations. An example of a group A device is a thermostat. An example of a group B device is a process control device that is required to pass data and/or alerts. Group C devices are even less expensive and only utilize the lower two frequencies. These devices could be equipment monitoring devices that detect the onset of vibration so that the equipment can be serviced proactively.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A method for non-orthogonal frequency division multiplexed communication through a non-linear transmission medium, the method comprising the steps of:

(a) selecting at least one desired bandwidth;

(b) selecting a non-orthogonal pair of base frequencies within a first bandwidth of said at least one desired bandwidth by a device;

(c) identifying where primary intermodulation products formed as a result of signal transmission on said pair of base frequencies fall within said first bandwidth by said device;

(d) selecting a plurality of non-orthogonal interleaved frequencies adjacent at least one of said pair of base frequencies so as to be interleaved between said primary intermodulation products to form a frequency cluster which includes said at least one of said pair of base frequencies and said interleaved frequencies, further comprising the step of adapting said at least one frequency cluster for sending a high priority communication on said at least one frequency cluster or for sending a high bandwidth communication on said at least one frequency cluster.

2. The method of claim 1 further comprising the step of adapting said at least one frequency cluster for sending a redundant communication on said at least one frequency cluster.

3. The method of claim 2 further comprising the step of adapting said frequency cluster for sending a communication in bursts in parallel during periods of reduced noise interference.

4. The method of claim 1 wherein said plurality of non-orthogonal interleaved frequencies are non-harmonic.

5. The method of claim 1 wherein said step of selecting said pair of base frequencies includes further selecting a third base frequency within said first bandwidth wherein said third base frequency is outside of said primary intermodulation products.

6. The method of claim 1 wherein said step of selecting a plurality of non-orthogonal interleaved frequencies includes selecting non-orthogonal interleaved frequencies that fill-in between said pair of base frequencies.

7. The method of claim 1 wherein said step of selecting a plurality, of non-orthogonal interleaved frequencies includes selecting non-orthogonal interleaved frequencies that cluster adjacent a single base frequency of said pair of base frequencies.

8. A method for non-orthogonal frequency division multiplexed communication through a non-linear transmission medium, the method comprising the steps of:
   (a) selecting at least one desired bandwidth:
   (b) selecting a non-orthogonal pair of base frequencies within a first bandwidth of said at least one desired bandwidth by a device;
   (c) identifying where primary intermodulation products formed as a result of signal transmission on said pair of base frequencies fall within said first bandwidth by said device;
   (d) selecting a plurality of non-orthogonal interleaved frequencies adjacent at least one of said pair of base frequencies so as to be interleaved between said primary intermodulation products to form a frequency cluster which includes said at least one of said pair of base frequencies and said interleaved frequencies,
   wherein said step of selecting non-orthogonal interleaved frequencies includes selecting non-orthogonal interleaved frequencies that cluster on adjacent frequencies so as to sandwich said single base frequency between said adjacent frequencies.

9. The method of claim 8 further comprising the step of adapting said at least one frequency cluster for sending a redundant communication on said at least one frequency cluster.

10. The method of claim 8 further comprising the step of adapting said frequency cluster for sending a communication in bursts in parallel during periods of reduced noise interference.

11. The method of claim 8 wherein said plurality of non-orthogonal interleaved frequencies are non-harmonic.

12. The method of claim 8 wherein said step of selecting said pair of base frequencies includes further selecting a third base frequency within said first bandwidth wherein said third base frequency is outside of said primary intermodulation products.

13. The method of claim 8 wherein said step of selecting a plurality of non-orthogonal interleaved frequencies includes selecting non-orthogonal interleaved frequencies that fill-in between said pair of base frequencies.

14. A method for non-orthogonal frequency division multiplexed communication through a non-linear transmission medium, the method comprising the steps of:
   (a) selecting at least one desired bandwidth;
   (b) selecting a non-orthogonal pair of base frequencies within a first bandwidth of said at least one desired bandwidth by a device;
   (c) identifying where primary intermodulation products formed as a result of signal transmission on said pair of base frequencies fall within said first bandwidth by a device;
   (d) selecting a plurality of non-orthogonal interleaved frequencies adjacent at least one of said pair of base frequencies so as to be interleaved between said primary intermodulation products to form a frequency cluster which includes said at least one of said pair of base frequencies and said interleaved frequencies,
   further including the step of selecting a second bandwidth of said at least one desired bandwidth, so as to at least partially but not entirely overlap said first bandwidth to thereby form corresponding first and second partially overlapping frequency groups.

15. The method of claim 14 further comprising the step of arranging so that said first frequency group is, with the exception of said overlap, of higher frequency than said second frequency group.

16. The method of claim 15 further comprising the steps of; and within said second frequency group:
   (a) selecting a non-orthogonal second pair of base frequencies;
   (b) identifying where second primary intermodulation products form as a result of signal transmission on said second pair of base frequencies within said second frequency group;
   (c) selecting a plurality of non-orthogonal second interleaved frequencies adjacent at least one of said, second pair of base frequencies so as to be interleaved between said second primary intermodulation products to form a second frequency cluster which includes said at least one of said second pair of base frequencies and said second interleaved frequencies.

17. A method for non-orthogonal frequency division multiplexed communication through a non-linear transmission medium, the method comprising the steps of:
   (a) selecting at least one desired bandwidth;
   (b) selecting a non-orthogonal pair of base frequencies within a first bandwidth of said at least one desired bandwidth by a device;
   (c) identifying where primary intermodulation products formed as a result of signal transmission on said pair of base frequencies fall within said first bandwidth by a device so as to enable the selection of additional frequencies which avoid said primary intermodulation products,
   further comprising the step of selecting a plurality of non-orthogonal interleaved frequencies adjacent at least one of said pair of base frequencies so as to be interleaved between said primary intermodulation products to form a frequency cluster which includes said at least one of said pair of base frequencies and said interleaved frequencies,
   wherein said plurality of non-orthogonal interleaved frequencies are non-harmonic,
   wherein said step of selecting a plurality of non-orthogonal interleaved frequencies includes selecting non-orthogonal interleaved frequencies that fill-in between said pair of base frequencies, wherein said step of selecting non-orthogonal interleaved frequencies includes selecting non-orthogonal interleaved frequencies that cluster on adjacent frequencies so as to sandwich said single base frequency between said adjacent frequencies.

18. A method for non-orthogonal frequency division multiplexed communication through a non-linear transmission medium, the method comprising the steps of:
(a) selecting at least one desired bandwidth;
(b) selecting a non-orthogonal pair of base frequencies within a first bandwidth of said at least one desired bandwidth by a device;
(c) identifying where primary intermodulation products formed as a result of signal transmission on said pair of base frequencies fall within said first bandwidth by said device so as to enable the selection of additional frequencies which avoid said primary intermodulation products,
further including the step of selecting a second bandwidth of said at least one desired bandwidth, so as to at least partially but not entirely overlap said first bandwidth to thereby form corresponding first and second partially overlapping frequency groups.

19. The method of claim 18 further comprising the step of arranging so that said first frequency group is, with the exception of said overlap, of higher frequency than said second frequency group.

* * * * *